US 6,655,316 B2

(12) United States Patent
Kerger et al.

(10) Patent No.: US 6,655,316 B2
(45) Date of Patent: Dec. 2, 2003

(54) VISUAL POSITION INDICATOR FOR VALVES WITH LINEAR MOVING VALVE STEM

(76) Inventors: Leon Kerger, 40 La Corniche, Mondorf les Bains (LU), L-5613; Bert Pistor, 408 Carney Rd., Greensburg, PA (US) 15601

( * ) Notice: Subject to any disclaimer, the term of this patent is extended or adjusted under 35 U.S.C. 154(b) by 0 days.

(21) Appl. No.: 10/016,227

(22) Filed: Oct. 31, 2001

(65) Prior Publication Data

US 2003/0079670 A1 May 1, 2003

(51) Int. Cl.[7] .............................................. F16K 37/00
(52) U.S. Cl. ....................................... 116/277; 116/272
(58) Field of Search ................................ 116/277, 270, 116/271, 274, 284, 285, 298, 272, 281, 282, 283, 305, 224; 137/300, 315.15

(56) References Cited

U.S. PATENT DOCUMENTS

| 1,610,452 A | * | 12/1926 | Kennedy .................. 116/34 R |
| 2,367,651 A | * | 1/1945 | Stone ........................ 116/277 |
| 2,485,942 A | | 10/1949 | Turner |
| RE26,838 E | | 3/1970 | Pecis |
| 3,804,056 A | * | 4/1974 | Lee et al. .................. 116/277 |
| 3,910,308 A | | 10/1975 | Mack |
| 4,494,565 A | | 1/1985 | Sinclair et al. |
| 4,606,374 A | | 8/1986 | Kolenc et al. |
| 4,831,957 A | * | 5/1989 | Goans ........................ 116/272 |
| 5,223,822 A | | 6/1993 | Stommes et al. |
| 5,469,805 A | | 11/1995 | Gibbs |
| 5,605,176 A | | 2/1997 | Herzberger |
| 5,749,606 A | * | 5/1998 | Lu et al. ..................... 285/86 |
| 6,135,147 A | | 10/2000 | Peters et al. |
| 6,241,213 B1 | * | 6/2001 | Butler ......................... 251/264 |
| 6,279,242 B1 | * | 8/2001 | Williams et al. ......... 33/501.45 |

* cited by examiner

Primary Examiner—Christopher W. Fulton
Assistant Examiner—Tania C. Courson
(74) Attorney, Agent, or Firm—DKW Law Group, PC; Roberta R. Wilson

(57) ABSTRACT

The present invention relates to a visual valve indicator comprised of a handle assembly with peripheral sidewalls attached to a linear moving valve stem for opening and closing of the valve and a grommet stratified into one or more color bands attached to and surrounding the base of the valve stem.

16 Claims, 3 Drawing Sheets

VISUAL POSITION INDICATOR FOR VALVES WITH LINEAR MOVING VALVE STEM

RELATED APPLICATION

There are no related applications.

FIELD OF THE INVENTION

The present invention relates to an apparatus for visually indicating the open and closed position of a valve having a linear moving valve stem.

BACKGROUND OF THE INVENTION

It is often difficult to determine at a glance whether a valve is open or closed. This problem is of particular concern in consumer goods, such as with valves on propane gas tanks, where harmful gases could escape without notice and potentially cause serious injury. Known types of indicating devises are generally not well suited for use in valve-containing consumer goods because these indicators are typically integrated with the valve assembly and/or contain a number of moving parts which increase the possibility of malfunction and also increase the cost of production.

Known inventions include those in which the valve indicator is part of the valve handle assembly. For example, U.S. Pat. No. 3,910,308 describes a valve indicator consisting of a knurled valve handle having windows that expose an on/off color indicator of an interior ring operating by means of a spring and ball bearing mechanism.

Other known indicator devices function by attachment to the valve stem or actuator stem. U.S. Pat. No. 5,469,805 discloses a valve position indicator fitted to the drive shaft of a valve actuator. The indicator has a sleeve interposed between an inner cylinder and an outer cylinder and arranged such that rotation of the actuator rotates the inner cylinder and causes the sleeve to slide between the inner and outer cylinders allowing a different color to be visible when the valve is open or closed.

Another known mechanism of operation for valve position indicators is by attachment of the indicator to the valve bonnet. U.S. No. Pat. 2,485,942 discloses an indicator comprised of contrasting color vanes, one affixed to the valve bonnet and the other responsive to valve stem movement. When the valve stem is moved, one vane slides over the other to indicate whether the valve is open or closed.

Each of the aforementioned inventions illustrates the disadvantages of known mechanisms for valve position indicators. These indicators operate by use of moving parts, which are additional to the valve mechanism itself. Additional moving parts not only increase costs of production, but could also potentially fail, leading possible error on the part of the operator and the need to replace the entire valve assembly.

SUMMARY OF THE INVENTION

The present invention is directed to a valve indicator wherein the open/closed position of the valve is indicated by the visible appearance of one or two color bands below the hand wheel on a linear moving valve stem. Although the present invention will be described with particular reference to propane gas tank valves, it will be appreciated that the invention has broader applications and may be used with other types of valves having a valve stem that moves linearly from the open to closed position and/or in other environments. The invention is comprised of a hand wheel assembly with a hand grip having peripheral sidewalls and a downward depending annular sleeve wherein the hand wheel assembly is attached to a linear moving valve stem which operates to open and close the valve. A grommet stratified into one or more color bands is attached to and rests on the valve bonnet adjacent to the point where the valve stem enters the valve bonnet. As the valve is closed, the length of the valve stem shortens, drawing the annular sleeve of the hand wheel assembly down over the grommet to obscure one or more layers of the grommet's color bands from vision, indicating that the valve is in the closed position. As the valve is opened, the length of the valve stem becomes longer, moving the annular sleeve of the hand wheel away from the grommet, thus exposing one or more layers of the grommet's color band, indicating that the valve is in the open position.

In a preferred embodiment, the indicating means of the present invention is utilized in a propane gas tank valve.

It is an object of the present invention to provide a visual signal on a valve to indicate that a valve is open or closed.

It is a further object of the present invention to provide an indicator that is advantageously suited for use in consumer goods containing valves.

It is an additional object of the present invention to provide an inexpensive means to provide a visual valve position indication.

It is another object of the present invention to provide visual position indicating means on a valve without the addition of moving parts to facilitate manufacturing.

It is yet another object of the present invention to enhance the safety of a manual valve by providing visual indication of the valve open position.

BRIEF DESCRIPTION OF THE DRAWINGS

The presently preferred embodiment of the invention is disclosed in the accompanying drawings wherein.

DETAILED DESCRIPTION OF THE PREFERRED EMBODIMENTS

Figure 1:
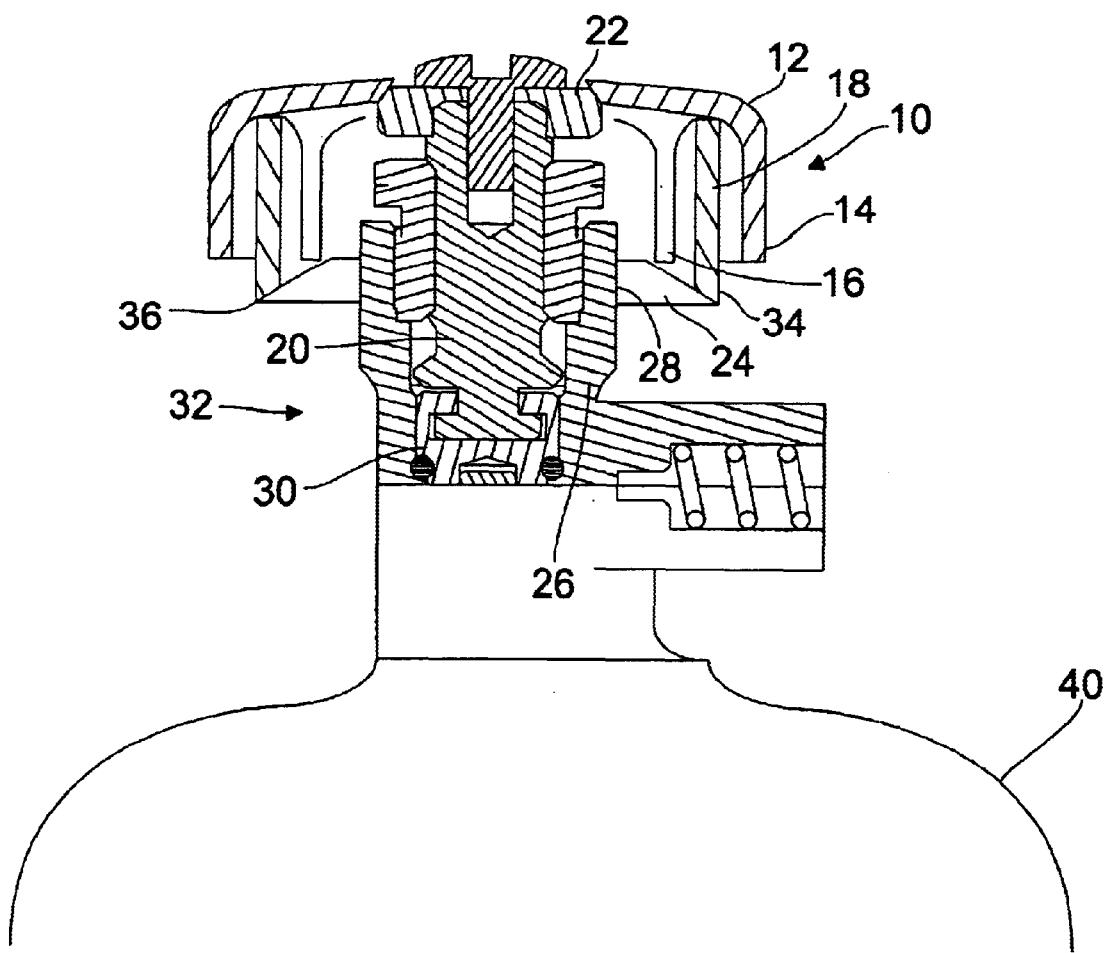
FIG. 1 is a cross-sectional elevational view of an upper portion of a valve assembly having the features of the present invention incorporated therein.

Referring now to the cross-sectional view in FIG. 1, there is illustrated hand wheel assembly 10 comprised of an exterior hand grip 12 with peripheral sidewalls 14 forming a recessed cavity 16 on the underside of grip 12. Sidewalls 14 are preferably provided with a surface and shape suitable for secure manual gripping. Disposed within cavity 16 is an integral downward depending annular sleeve 18.

Hand wheel assembly 10 is attached to a valve stem 20 by a fastener 22. A colored grommet 24 is attached to the upper portion of a valve bonnet 26. Grommet 24 may be affixed by any number of means, although preferably by an interference fit. A groove 28 may be precisely machined or otherwise formed in valve bonnet 26 corresponding to the limit of travel of stem 20.

In the preferred embodiment, stem 20 is threadedly engaged with a valve actuator 30. Valve 32 is actuated by rotation of hand wheel assembly 10 attached to stem 20, causing stem 20 to move linearly in and out of valve bonnet 26. There may be alternate means of actuating the valve other than by a threaded stem, and the present invention will accommodate any linear moving valve stem having a fixed closed position.

An annular sleeve distal end 34 projects at least as far as sidewalls 14, and preferably slightly beyond sidewalls 14, in order to enhance the visual contrast between sleeve 18 and the grommet 24. Distal end 34 may be tapered outwardly to complement a beveled surface 36 of grommet 24. Furthermore, sleeve 18 must encompass grommet 24 with a close tolerance in both the vertical and horizontal planes in order to achieve accurate indications of position. Grommet 24 must become exposed upon the slightest opening of valve 32 so as to properly indicate position. In a pressurized gas tank, fluid communication occurs upon the slightest opening of the valve seat, and a greater degree of displacement of the valve does not appreciably affect the rate of flow.

Figure 2:
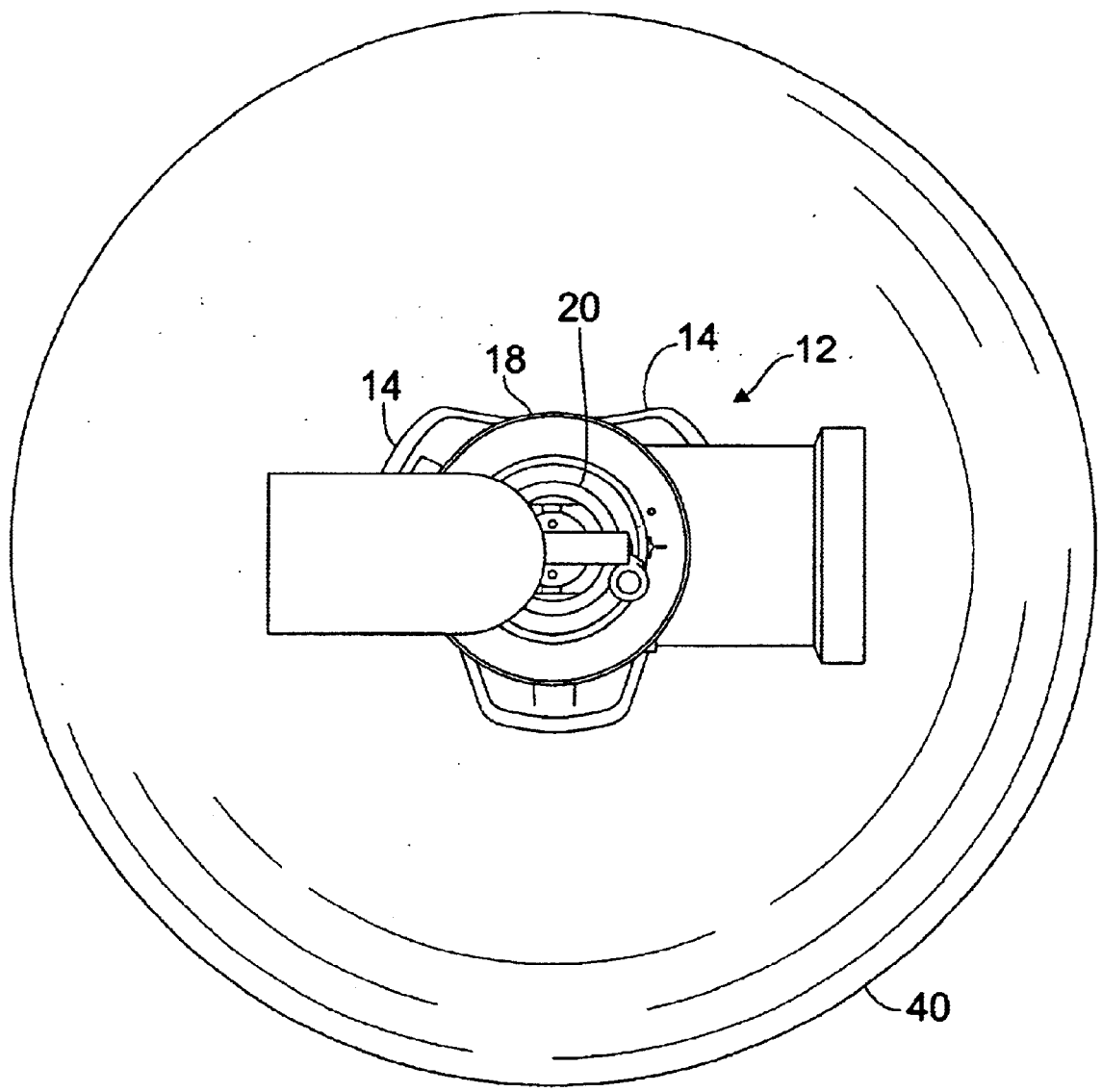
FIG. 2 is bottom plan view depicting the features of the present invention.

A bottom plan view of the valve indicator in valve closed position is depicted in FIG. 2. In the preferred embodiment, exterior handgrip 12 has fluted peripheral sidewalls 14 to provide a suitable gripping surface. Inside the periphery of handgrip 12, annular sleeve 18 is projects downward to cover colored grommet 24 surrounding valve stem 20.

Figure 3:
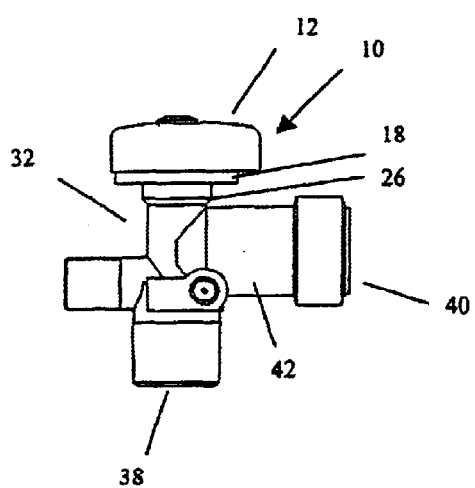
FIG. 3 is a perspective view of the valve position indicator in a valve closed position.

FIG. 3 depicts the appearance of the valve position indicator when valve 32, with an inlet 38 and an outlet 40, is in the closed position. As valve 32 is closed, valve stem 20, as depicted in FIG. 1, is rotated downward into a valve body 42 to its maximum point of travel. Sleeve 18 is thereby drawn toward valve bonnet 26. When the valve seat (not shown) closes, grommet 24 is completely concealed within sleeve 18. The disappearance of colored grommet 24 indicates that valve 32 is in the closed position.

Figure 4:
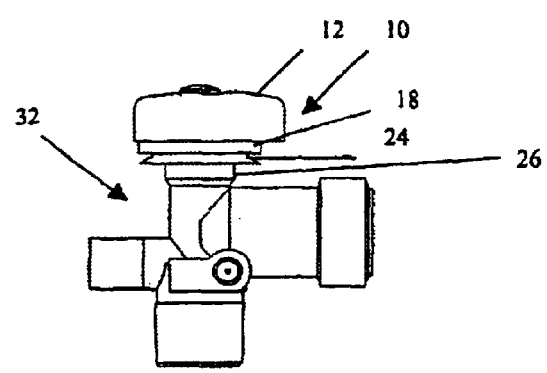
FIG. 4 is a perspective view of the valve position indicator in a valve open position.

FIG. 4 depicts the appearance of the valve position indicator when valve 32 is in the open position. As valve 32 is opened, valve stem 20, as depicted in FIG. 1, extends as it is rotated away from valve bonnet 26 thereby moving sleeve 18 of hand wheel assembly 10 away from valve bonnet 26 to expose colored grommet 24. The visual appearance of colored grommet 24 indicates that valve 32 is in the open position.

In an alternate embodiment, grommet 24 is stratified into two color bands around valve bonnet 26. Sleeve 18 covers the first band when in the fully retracted or closed position.

As an example, and not by way of limitation, grommet 24 may be constructed of a resilient, elastomeric material that will stretch to conform around the bonnet 26 and retain itself in friction fit. The color bands may also be designated by a bright fluorescent painted ring or rings.

As demonstrated by the detailed description of the preferred embodiment, the improved arrangement of the present invention allows the user of the valve to readily determine whether the valve is in the open or closed position. The simplistic construction achieves long-term performance of the indicator at a nominal cost of production.

According to the provisions of the patent statutes, we have explained the principle, preferred construction, and mode of operation of the invention, and have illustrated and described what we now consider to represent its best embodiments. However, it should be understood that within the scope of the appended claims and the foregoing description, the invention may be practiced, otherwise than specifically illustrated and described.

We claim:
1. A valve position visual indicator comprising:
 a. a hand wheel assembly mounted on a valve, the hand wheel assembly having a downward depending annular sleeve;
 b. wherein the hand wheel assembly is attached to a linear moving valve stem, wherein said stem operates to open and close the valve;
 c. a grommet defining a circular opening forming a color band;
 d. said grommet being attached to and encircling a bonnet portion attached to said valve adjacent to the point where said valve stem enters the valve bonnet;
 said grommet projecting radially outward from the periphery of said valve bonnet such that an outer radius of said grommet intersects at least a portion of the path of said sleeve; and
 e. said sleeve providing means for concealing said grommet at a point of maximum travel of the stem corresponding to a valve closed position, and for exposing the color bands on said grommet corresponding to a valve open position.

2. The valve position visual indicator as set forth in claim 1, wherein said sleeve means for concealing said grommet comprises linear movement such that when the valve is in the closed position, the sleeve conceals said grommet entirely.

3. The valve position visual indicator as set forth in claim 1, wherein said grommet defining a circular opening suitable for an interference fit about the perimeter of said valve bonnet.

4. The valve position visual indicator as set forth in claim 1, wherein said grommet also having a flared sidewall beveled radially outwardly to a predetermined point so as to be completely concealed by said annular sleeve portion having a tapered end portion cooperative wish said flared sidewall when the valve stem is in the closed position.

5. The valve position visual indicator as set forth in claim 1, wherein said valve being mounted on a propane gas tank and in fluid communication therewith.

6. The valve position visual indicator as set forth in claim 1, wherein the hand wheel assembly also having peripheral sidewalls outside the diameter of the sleeve.

7. The visual position indicator as set forth in claim 1, wherein an outer radius of said grommet intersects at least a portion of the path of said sleeve, wherein the sleeve makes contact with said grommet and urges the grommet downward as the valve wears.

8. A valve position indicating means for use with a linearly moving valve stem comprising:
 a) a valve body having a bonnet portion, an inlet port, an outlet port and an actuator means for controlling fluid communication between said inlet and outlet ports;
 b) a stem portion connected to said actuator means extending into said bonnet portion through a hollow bore, said stem portion moveable axially within said bore to open or close said actuator means;
 c) a hand wheel portion fastened to said stem portion for rotating the stem portion within the bore such that rotation of the hand wheel portion displaces the stem portion linearly within the hollow bore to open or close said actuator means;
 d) a sleeve portion attached to the hand wheel portion and depending downwardly therefrom and having a hollow inside diameter;

e) an annular grommet portion affixed to the bonnet portion having an outside diameter less than the sleeve portion inside diameter and projecting radially outwardly from the periphery of the bonnet portion;

f) said grommet portion providing a visually contrasting band around said bonnet portion such that linear movement of the stem causes the sleeve to fully conceal said grommet when the actuator means reaches the point of closure.

9. The valve position indicating means as set forth in claim 8, wherein said hand wheel also having peripheral sidewalls depending downwardly to facilitate gripping and turning of said hand wheel.

10. The valve position indicating means as set forth in claim 8, wherein said grommet portion having an outwardly beveled side surface terminating at a point approximately adjacent said interior diameter of said sleeve portion when said actuator means is in the closed position.

11. The valve position indicating means as set forth in claim 8, wherein said grommet portion being comprised of an elastomeric material, said bonnet portion also having a groove circumscribed radially about said bonnet portion for retaining the position of said grommet portion for precise marking associated with the closed position of the valve actuator means.

12. The valve position indicating means as set forth in claim 8, wherein said grommet portion being a fluorescent green color for visually contrasting indication when exposed by rotation of the valve stem.

13. The valve position indicating means as set forth in claim 8, wherein said grommet portion being a fluorescent color selected from the group of colors consisting of green or red for visually contrasting indication when exposed by rotation of the valve stem.

14. The visual position indicator as set forth in claim 8, wherein an outer radius of said grommet intersects at least a portion of the path of said sleeve, wherein the sleeve makes contact with said grommet and urges the grommet downward as the valve wears.

15. A visual position indicator for a valve with a linear moving valve stem which comprises:

a. a means for moving the valve stem linearly in and out of the valve;

b. a colored band attached to and resting on a bonnet portion of said valve adjacent to the point where said valve stem enters the valve bonnet, and wherein said color band projecting radially outward from the periphery of said valve bonnet such that an outer radius of said color band intersects at least a portion of the path of a concealing device, wherein the concealing device makes contact with said color band and urges the color band downward as the valve wears; and c. said concealing device for concealing the colored band at a point of maximum travel of the valve stem corresponding to a valve closed position, and for exposing the colored band when the valve is in an open position, said concealing device being attached to or moving with the means for moving the valve stem; said concealing device encompassing said colored band in close proximity thereto when in the closed position.

16. The visual position indicator as set forth in claim 15, wherein said colored band is comprised of an elastomeric band retentively positioned at a predetermined point on said bonnet portion corresponding to the point of maximum travel of the valve in the closed position.

* * * * *